(12) United States Patent
Xu

(10) Patent No.: US 9,146,162 B2
(45) Date of Patent: Sep. 29, 2015

(54) SENSOR ARRANGEMENT FOR LIGHT SENSING AND TEMPERATURE SENSING AND METHOD FOR LIGHT SENSING AND TEMPERATURE SENSING

(71) Applicant: ams AG, Unterpremstätten (AT)

(72) Inventor: Gonggui Xu, Plano, TX (US)

(73) Assignee: ams AG, Unterpremstaetten (AT)

( * ) Notice: Subject to any disclaimer, the term of this patent is extended or adjusted under 35 U.S.C. 154(b) by 5 days.

(21) Appl. No.: 14/231,594

(22) Filed: Mar. 31, 2014

(65) Prior Publication Data

US 2014/0293272 A1 Oct. 2, 2014

Related U.S. Application Data

(60) Provisional application No. 61/806,961, filed on Apr. 1, 2013.

(30) Foreign Application Priority Data

Apr. 5, 2013 (EP) ..................... 13162530

(51) Int. Cl.
| | |
|---|---|
| *G01N 21/00* | (2006.01) |
| *G01K 13/00* | (2006.01) |
| *G01J 1/44* | (2006.01) |
| *H04M 1/22* | (2006.01) |

(52) U.S. Cl.
CPC . *G01K 13/00* (2013.01); *G01J 1/44* (2013.01); *H04M 1/22* (2013.01); *H04M 2250/12* (2013.01)

(58) Field of Classification Search
CPC ... H01J 37/32935; G01N 21/64; G01N 21/68; G01N 2015/1037; G01J 3/02
USPC ........................................................ 356/72
See application file for complete search history.

(56) References Cited

U.S. PATENT DOCUMENTS

| | | | |
|---|---|---|---|
| 2009/0309711 A1 | 12/2009 | Adappa et al. | |
| 2013/0093432 A1* | 4/2013 | Matsumoto et al. | 324/537 |
| 2013/0132032 A1* | 5/2013 | McKeown | 702/182 |
| 2013/0241530 A1* | 9/2013 | Wernet et al. | 324/76.11 |
| 2013/0248711 A1* | 9/2013 | Lambkin et al. | 250/332 |

FOREIGN PATENT DOCUMENTS

JP    2004-274550 A    9/2004

OTHER PUBLICATIONS

Pertijs, M. et al., "A CMOS Smart Temperature Sensor With a 3σ Inaccuracy of ±0.1° C. From −55° C. to 125° C.", IEEE Journal of Solid-State Circuits, Dec. 2005, pp. 2805-2815, vol. 40, No. 12.

* cited by examiner

*Primary Examiner* — Tarifur Chowdhury
*Assistant Examiner* — Md Rahman
(74) *Attorney, Agent, or Firm* — McDermott Will & Emery LLP

(57) ABSTRACT

A sensor arrangement for light sensing and temperature sensing comprises a first sensor input (1) for connecting a temperature sensor (11) and a second sensor input (2) for connecting a light sensor (21), in particular an ambient light sensor. A sensor switch (S3) electrically connects either the first or the second sensor input (1, 2) to an integration input (41) of an integrating analog-to-digital converter (4). A reference circuit (5) connects to the integration input (41) via a first switch (S2). A first reference input (42) of the integrating analog-to-digital converter (4) is to be connected with a first reference potential (Vb1). A counter (6) connects to an integration output (43) of the integrating analog-to-digital converter (4). And a controller unit (6) connects to the counter (6) and is designed to control the first switch (S2) depending on an integrated sensor signal (Vout) integrated by the integrating analog-to-digital converter (4).

10 Claims, 3 Drawing Sheets

Figure 1:
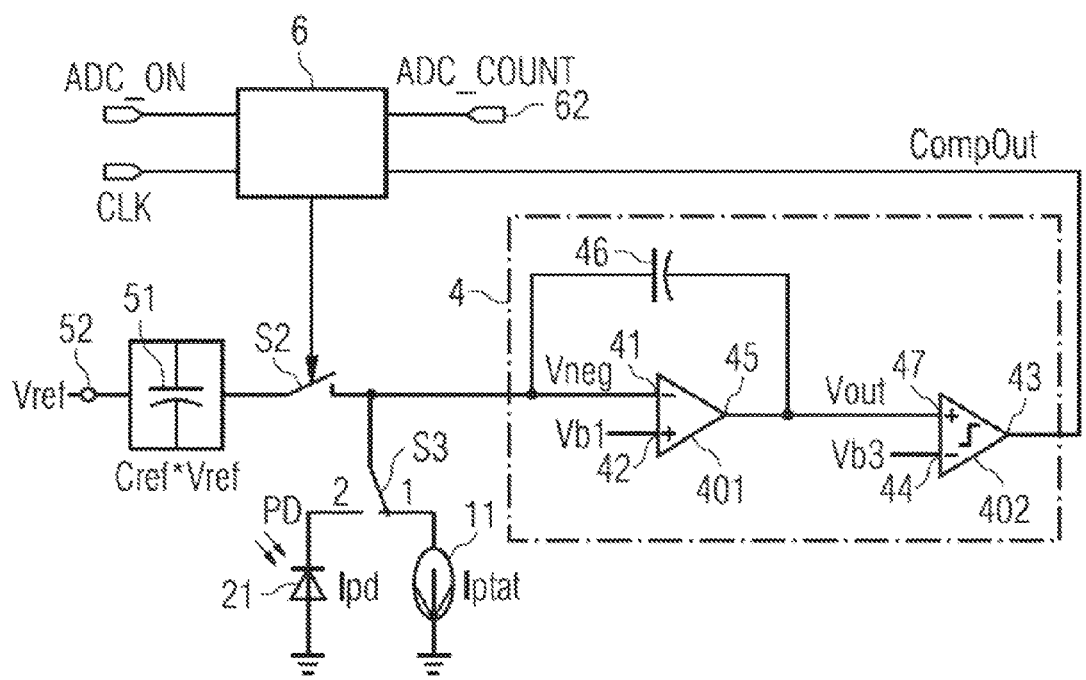

SENSOR ARRANGEMENT FOR LIGHT SENSING AND TEMPERATURE SENSING AND METHOD FOR LIGHT SENSING AND TEMPERATURE SENSING

CROSS-REFERENCE TO RELATED APPLICATIONS

The present application claims the benefit of priority under 35 U.S.C. §119 from U.S. Provisional Patent Application Ser. No. 61/806,961, filed on Apr. 1, 2013, and claims priority to European Patent Application No. 13162530.3 filed on Apr. 5, 2013, both disclosures of which are hereby incorporated by reference in their entirety for all purposes.

DESCRIPTION

This invention relates to a sensor arrangement for light sensing and temperature sensing and to a method for light sensing and temperature sensing.

Modern consumer electronics like Smartphones make increasing use of many different sensors which are often included in the same device. In one particular application ambient light sensors are used for display management where these sensors measure the ambient light brightness. Depending on the brightness of the ambient light the display illumination can be adjusted and precious power can be saved. If, for example, the ambient light is bright, a higher backlight illumination for display panel is needed. If, however, the ambient light is darker, a lower backlight illumination for display panel is sufficient. By dynamically adjusting the display panel brightness, ambient light sensors help display panel to optimize the operation power.

A common ambient light sensor comprises semiconductor junctions to generate a sensor signal to detect incident light. The light to electron conversion of typical semiconductor junctions, however, is strongly depending on temperature. Thus, for improved ambient light sensing, it is desirable to measure the temperature of semiconductor junctions used in an ambient light sensor.

Frequently ambient light sensor and temperature sensors use separate circuits for their respective signal acquisition and processing. For example, ambient light sensors often use photodiodes and charge balancing analog-to-digital converters. Temperature sensors commonly use a separate sigma-delta analog-to-digital converter. However, two independent sensor architectures take extra silicon area to implement. Especially in modern consumer electronics saving silicon area is at the essence and corresponding cost of fabrication can be considerably reduced as sensor units are produced in large numbers.

The object of this invention is to provide a sensor arrangement for light sensing and temperature sensing and a method for light sensing and temperature sensing that allow for compact and cost effective production.

This object is achieved by the subject matter of the independent claims. Further embodiments are subject to independent claims.

According to an aspect of the invention, a sensor arrangement for light sensing and temperature sensing comprises a first sensor input for connecting a temperature sensor and a second sensor input for connecting a light sensor. In particular, the light sensor can be an ambient light sensor. Furthermore, the arrangement comprises a sensor switch for electrically connecting either the first or the second sensor input to an integration input of an integrating analog-to-digital converter.

A reference circuit is connected to the integration input via a first switch. A first reference input in the integrating analog-to-digital converter is to be connected with a first reference potential. Finally, a controller unit is connected to an integration output of the integrating analog-to-digital converter and designed to control the first switch depending on an integrated sensor signal integrated by the integrating analog-to-digital converter. The controller unit comprises a signal output to provide a number of counts representing the sensor signal to be measured.

In operation of the sensor arrangement a temperature sensor is connected to the first input and/or a light sensor is connected to the second sensor input. Depending on the signal to be acquired either the temperature sensor or the light sensor is selected by electrically connecting the first or the second sensor to the integration input by means of the sensor switch, respectively.

The sensor signal from the light sensor or temperature sensor is acquired by means of the integrating analog-to-digital converter, i.e. the sensor signal is integrated. The integrated sensor signal is applied to the controller unit which, in turn, generates the number of counts which is indicative of the integrated sensor signal. The controller unit controls the first switch such as to electrically connect the reference circuit to the integration input. The switching depends on the level of the integrated sensor signal in relation to the first reference potential. As a consequence the integrated sensor signal is cancelled depending on a reference provided by the reference circuit. After the reference is set, the controller unit controls the first switch such as to electrically disconnect the reference circuit from the integration input. As a consequence the number of counts is increased by one count.

The above presented sensor arrangement can be used for both light sensing and temperature sensing using the same signal path for sensor signal acquisition. By using the same signal path for both sensors the silicon area of the sensor arrangement can be reduced. Thus, the sensor arrangement can be produced with considerable lower cost.

The acquisition of a sensor signal is preferably limited to a given predetermined time frame. The number of counts generated by the counter in that time then is measure of signal strength.

According to another aspect of the invention, the sensor arrangement is selectively operated in a temperature sensing mode or in the light sensing mode. Via the sensor switch the first sensor input or the second sensor input is electrically connected to the integration input, respectively.

According to another aspect of the invention, the controller unit is designed to switch the first switch between its open state and its closed state depending on a clock cycle.

Due to integration of the sensor signal the integrated sensor signal is established, e.g. by accumulating electric charge. If the integrated sensor signal at integrator output reaches a certain level with respect to the first reference potential the controller unit controls the first switch and the integrated sensor signal gets cleared by means of the reference circuit. This process will be referred to as charge dumping hereinafter.

The time for charge dumping to proceed is determined by the clock cycle of a system clock, e.g. clearing is executed within one clock period. After charge dumping is completed the controller unit controls the first switch to return back in its open state.

This way the number of counts generated by the controller unit relates to the number of consecutive charge dumping events.

According to another aspect of the invention, the integrating analog-to-digital converter comprises a second reference input to be connected with a second reference potential. The second reference potential is used to adjust a bias of the integrating analog-to-digital converter.

According to another aspect of the invention, the second reference potential is set to different values depending on whether the first or the second sensor input is electrically connected to the integration input. This way a bias can be set according to whether the temperature or light sensor is electrically connected to the sensor arrangement, respectively.

According to another aspect of the invention, the reference circuit comprises a reference capacitor connected between a reference terminal to be connected with a reference potential and connected to the first switch.

The reference circuit provides a reference, more precisely, a reference charge, depending on the capacity of the reference capacitor and a reference voltage to be connected with the circuit. Preferably, the reference circuit is charged with the reference charge during the time the circuit is disconnected from the integrating input.

As soon as the controller unit connects the reference circuit to the integrating input by means of the first switch, the reference charge can be used to cancel the integrated sensor signal acquired by the integrating analog-to-digital converter, i.e. to execute charge dumping.

According to another aspect of the invention, the reference capacitor is further connected to another terminal to be connected with the second reference potential via a second switch. The reference capacitor is further connected via a third switch to ground potential and the reference potential via a fourth switch. The first, second, third and fourth switches are switched open by the controller unit such that the first and fourth switches are switched open when the second and third switches are switched close and vice versa. In other words the switches are inverted in the sense that when first and fourth switch are open, second and third switch are closed and vice versa.

This particular embodiment assures that the reference capacitor is charged with the reference charge during the time the first switch is closed.

According to another aspect of the invention, the integrating analog-to-digital converter comprises an integrator comprising an amplifier with the integration input and the second reference input as input terminals. The integrating analog-to-digital converter also has an amplifier output and an integration capacitor connected to the integration input and the amplifier output. Finally, a comparator is connected via a first comparator input to the amplifier output and comprises the first reference input as second comparator input and comprising the integration output as comparator output.

The integrator provides means to integrate the sensor signal in order to accumulate the signal into the integrated sensor signal. Via the amplifier output the integrated sensor signal is applied to the first comparator input. By means of the comparator the integrated sensor signal is compared with the first reference potential present at the first reference input to generate the comparison signal. If the integrated sensor signal is bigger than the first reference potential the comparison signal is set to a high state. If the integrated sensor signal is smaller than the first reference potential the comparison signal is set to a low state.

According to another aspect of the invention, the light sensor generates a photo current depending on photons incident on the light sensor. The temperature sensor generates a proportional to absolute temperature current depending on a temperature of the sensor arrangement.

According to another aspect of the invention, the temperature sensor comprises a bandgap voltage reference circuit.

According to another aspect of the invention, the controller unit comprises a timer to set an overall integration time. As the sensor arrangement accumulates sensor signal to generate an integrated sensor signal it is preferred to end the acquiring of sensor signal after a predetermined time frame defined by the overall integration time. The number of counts then is a convenient means to characterize the sensor signal, e.g. the signal magnitude.

The controller unit may comprise means to activate and end the acquiring of sensor signal for the overall integration time. Such means, however, can also be used from a higher level device, e.g. by means of an appropriate input pin of the sensor arrangement. It may be convenient if in such a case the controller unit were to comprise such an input pin.

According to another aspect of the invention, the controller unit comprises microprocessor or control logic.

According to another aspect of the invention, the capacity of the reference capacitor and/or the capacity of the integration capacitor are adjustable.

According to another aspect of the invention, the sensor arrangement is integrated in an integrated circuit.

According to an aspect of the invention, a method for light sensing and temperature sensing with a sensor arrangement comprising an integrating analog-to-digital converter comprises the steps of selecting between a temperature sensing mode and light sensing mode by switching between a temperature sensor and a light sensor as input to the integrating analog-to-digital converter. Acquire from the selected temperature sensor or light sensor a sensor signal. Integrate the sensor signal to generate an integrated sensor signal. Generate a number of counts which is indicative to the integrated sensor signal. Finally, the integration is cancelled with a reference level when the integrated sensor signal reaches a predetermined condition in relation to the first reference potential.

The above presented sensor arrangement can be used for both light sensing and temperature sensing using the same signal path for sensor signal acquisition. By using the same signal path for both sensors the silicon area of the sensor arrangement can be kept small. Thus, the sensor arrangement can be produced with considerable lower cost.

Preferably, the method is executed during an overall integration time to perform consecutive cycles of acquisition wherein the sensor signal is integrated such as to build up charge stored by means of the analog-to-digital converter until the built up charge reaches a first reference potential. When the first reference potential has been reached the built up charge is discharged with a reference charge during a determined time, like a clock cycle. The number of counts provides a representation of the sensor signal.

In the following, the principle presented above will be described in more detail with respect to drawings in which exemplary embodiments are presented.

Figure 2A:
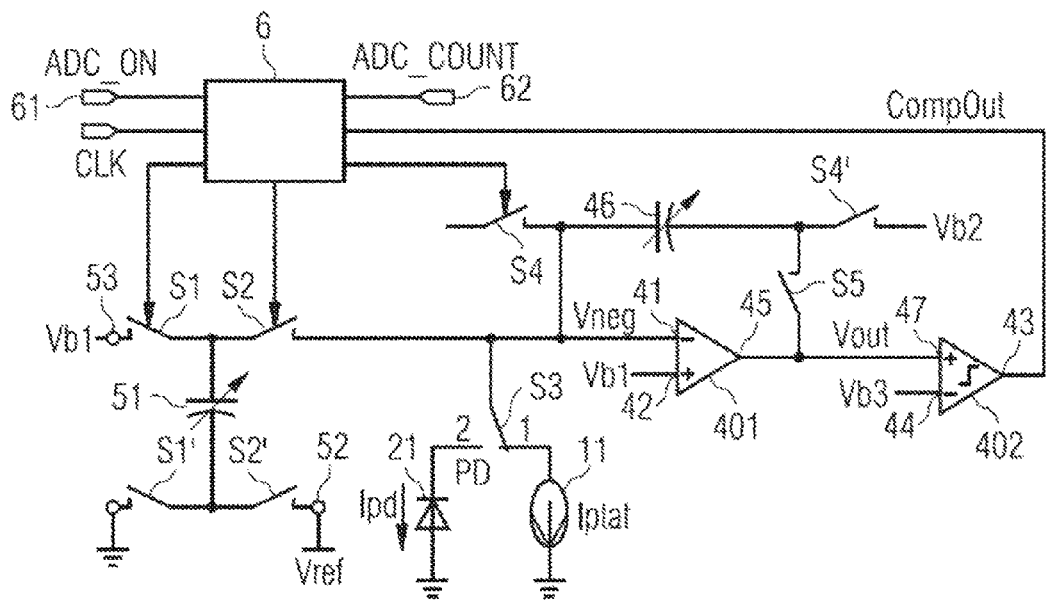
Figure 2B:
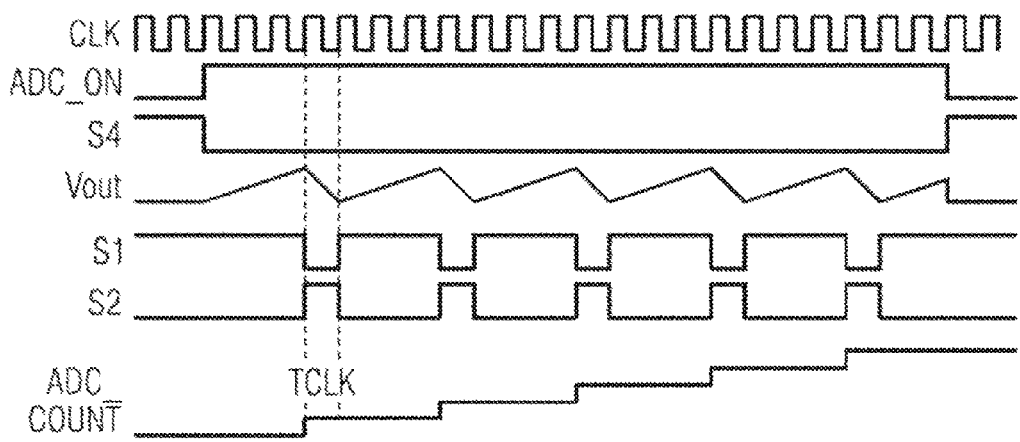
Figure 3:
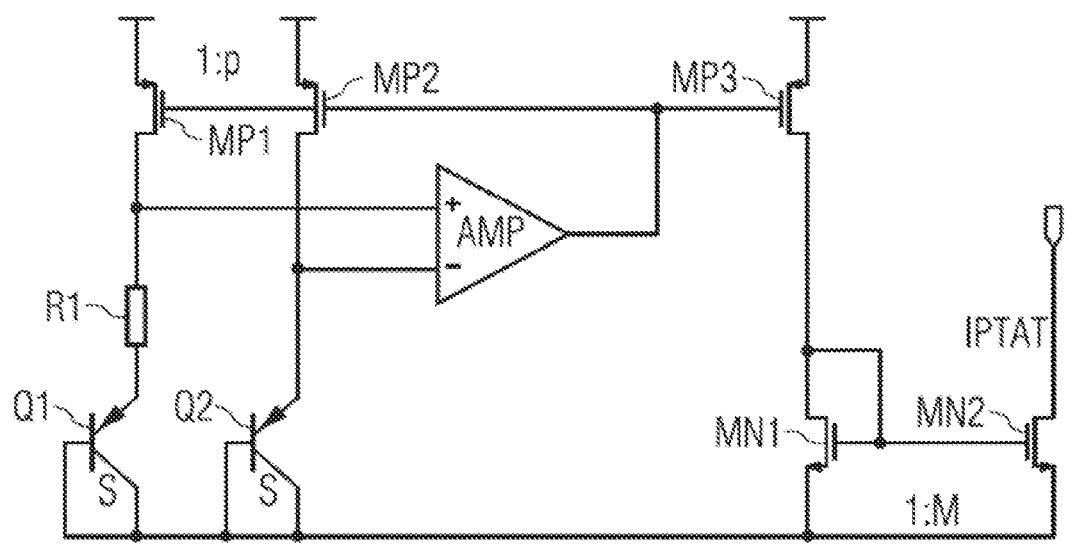

FIG. 1 shows an exemplary embodiment of a sensor arrangement for light sensing and temperature sensing according to the principle presented, FIG. 2a shows another exemplary embodiment of a sensor arrangement for light sensing and temperature sensing according to the principle presented, FIG. 2b shows a timing diagram of the sensor arrangement according to FIG. 2a, and FIG. 3 shows an exemplary embodiment of a temperature sensor to be used with a sensor arrangement for light sensing and temperature sensing according to the principle presented.

FIG. 1 shows an exemplary embodiment of a sensor arrangement for light sensing and temperature sensing according to the principle presented. The sensor arrangement comprises a first sensor input 1 for connecting a temperature sensor 11 and a second sensor input 2 for connecting a light sensor 21, in particular an ambient light sensor. The arrangement also comprises an integrating analog-to-digital converter 4, a reference circuit 5, and a controller unit 6.

A sensor switch S3 is used to select between the temperature sensor 11 and the light sensor 21. According to the selection the sensor arrangement is either operated in a temperature sensing mode or light sensing mode, respectively. In this respect, sensor switch S3 is used to electrically connect either the first or the second sensor input 1, 2 to an integration input 41 of an integrating analog-to-digital converter 4.

The integrating analog-to-digital converter 4 further comprises an integrator based on an amplifier 401 having the integration input 41 and a second reference input 42 as input terminals. An integration capacitor 46 is connected between an amplifier output 45 and the integration input 41. Furthermore, a comparator 402 is connected to the amplifier output 45 via a first comparator input 47. The comparator 402 has a first reference input 44 as second comparator input and the integration output 43 as comparator output.

The reference circuit 5 is connected to the integration input 41 via a first switch S2. A second reference input 42 of the integrating analog-to-digital converter 4 is connected with a second reference potential Vb1. The controller unit 6 is connected to an integration output 43 of the integrating analog-to-digital converter 4. The controller unit 6 has a clock input CLK to receive a system clock.

The operation principle of the sensor arrangement for light sensing and temperature sensing will be explained in detail below. In general, however, the integrating analog-to-digital converter 4 constitutes a charge balancing analog digital converter to collect a photo current Ipd from the light sensor 21, e.g. a photodiode, or a thermo current Iptat from the temperature sensor 11, e.g. a Proportional To Absolute Temperature (PTAT) element, and converts the respective sensor signals into counts. The proposed circuit architecture combines light sensing and temperature sensing into single circuit architecture.

Depending on the selected sensor, the corresponding sensor signal, i.e. the photo current Ipd or the thermo current Iptat, is integrated by means of the integration capacitor 46. If the charge integrated into the integration capacitor 46 is larger than a unit charge packet determined by the reference circuit 5, the controller unit 6 will increment a number of counts by one count and the charge on the integration capacitor 46 will be decreased by one unit charge packet (charge dumping). Preferably, integrating the sensor signal is done for a certain amount of time called overall integration time, for example 100 ms, which is determined by a system clock. The number of counts ADC_COUNT acquired by the controller unit 6 during that time is a measure of brightness of the ambient light or of the temperature of the sensor arrangement.

In more detail, the sensor arrangement can be operated along the following operation modes. First, by setting the sensor switch S3 the sensor arrangement is set to a temperature sensing mode or to a light sensing mode. This can be done via the controller unit 6 or by some other external means like a microcontroller or control logic embedded in an electronic device to be used with the sensor arrangement, e.g. a Smartphone.

In the following, the sensor signal acquisition will be explained with respect to the light sensing mode and the light sensor 21 connected to integrating analog-to-digital converter 4. However, the principles of operation can be applied in analogy to the temperature sensor 11 as well.

The sensor signal acquisition can be initialized by applying a start signal ADC_ON to an input 61 of the controller unit 6. If the start signal ADC_ON is low the light sensor 21 is cleared. At the same time the integration capacitor 46 is cleared. The integrated sensor signal Vout at the amplifier output 45 is now lower than first reference potential Vb3 at the first reference input 44. Thus, at comparator 402 a comparison signal CompOut is low. In parallel, the reference circuit 5 is charged to hold a reference charge Cref•Vref but is disconnected from the integrating analog-to-digital converter 4, in particular, from an integration node Vneg. Also the number of counts represented by a counter signal ADC_COUNT at output 62 of the controller unit 6 is cleared to be zero.

If the start signal ADC_ON is set to high state, the photo current Ipd of the light sensor 21 is integrated as sensor signal via node Vneg onto the integration capacitor 46 and integrated sensor signal Vout is ramping up. As soon as the integrated sensor signal Vout is larger than the first reference potential Vb3, the comparison signal Compout at the comparator output 43 is set to high state. In turn, the number of counts ADC_COUNT is increased by one unit. This causes the controller unit 6 to switch the first switch S2 so that the reference circuit 5 is electrically connected to the integration input 41 of the integrating analog-to-digital converter 4. As a consequence, the charge packet Cref•Vref previously charged onto the reference circuit 5 is connected to the integration node Vneg and discharges the charge present on the integrating capacitor 46 (charge dumping). The discharging stops after a certain amount of time defined by the system clock CLK.

After the integrating capacitor 46 got discharged by charge dumping the integrated sensor signal Vout is lower than the first reference potential Vb3 and the controller unit 6 disconnects the reference circuit 5 from the integration input 41. A new acquisition cycle starts and the integrated sensor signal Vout ramps up again.

The above-described acquisition cycle will be repeated during the overall integration time. The number of counts ADC_COUNT is a convenient measure of the sensor signal. When the ambient light is strong the sensor signal will be larger. The discharging by the charge packet will occur more frequently. This leads to a corresponding large number of counts ADC_COUNT. On the other side when the ambient light is weak the sensor signal will be smaller as well. The charge packet will be less frequently used to discharge the charge to the integration node Vneg. Hence, the number of counts ADC_COUNT will be correspondingly smaller.

The second reference potential Vb1 can be selected depending on sensor selection, i.e. depending on whether the light sensor 21 or temperature sensor 11 is connected to the sensor arrangement. For the sensor arrangement to work properly with both sensor types, the integration node Vneg biasing can be reconfigured through the second reference potential Vb1. This way conditions can be adjusted to the respective sensor.

FIG. 2a shows another exemplary embodiment of a sensor arrangement for light sensing and temperature sensing according to the principle presented. This embodiment is based on the one presented with respect to FIG. 1. So only the differences will be discussed in some detail below.

The reference circuit 5 comprises an adjustable reference capacitor 51 connected to a reference terminal 53 to be connected with the second reference potential Vb1 via a second switch S1. The reference capacitor 51 is further connected via a third switch S1' to ground potential and the reference potential via a fourth switch S2'. The first, second, third and fourth switches S1, S1', S2, S2' are controlled by the controller unit 6 such that the first and fourth switch S2, S2' are open when the second and third switch S1, S1' are closed and vice versa. In other words the switches are inverted in the sense that when first and fourth switch are open, second and third switch are closed and vice versa.

Furthermore, the second reference potential Vb1 can be electrically connected to the integration input 41 by means of the fifth switch S4. There is a sixth switch S4' connecting the integration capacitor 46 and a third reference input 47 to be connected with a third reference potential Vb2. The fifth and sixth switch S4, S4' are either both in their open state or in their closed state. These switches are used to further set bias condition of the integrating analog-to-digital converter 4.

Finally, there is a seventh switch S5 connecting the integration capacitor 46 with amplifier output 45 and the first comparator input 47. This switch is used to activate or deactivate the sensor arrangement depending on a starting signal ADC_ON to be applied to the controller unit 6 by means of a start input 61.

The sensor gain can be reconfigured by changing charge packet size used for charge dumping. Accordingly, the reference and integration capacitors 46, 51 are both adjustable.

The operation of the sensor arrangement of FIG. 2a will be explained with respect to FIG. 2b.

FIG. 2b shows a timing diagram of the sensor arrangement according to FIG. 2a. The drawing shows circuit configuration by the states of switches involved and their operation timing are added. In the drawing the timeline runs from left to right.

In the diagram the starting signal ADC_ON is shown on the top together with system clock CLK having clock period TCLK. When the starting signal ADC_ON is low, the fifth and sixth switches S4, S4' are in their closed state and vice versa. The fifth and sixth switches S4, S4' are used as an initialization circuit for the integration capacitor 46.

When the starting signal ADC_ON is low, the sensor arrangement is at reset, i.e. the amplifier 401 is at open loop. The integration node Vneg is clamped at the voltage level of the first reference potential Vb1; the amplifier output 45 is clamped at voltage level Vb2; the reference circuit 5 is to charged via reference capacitor 51 between ground potential and second reference potential Vb1.

When the starting signal ADC_ON is high, the amplifier 401 is at closed loop. The sensor signal, i.e. photo current Ipd or thermo current Iptat, is integrated at node Vneg and the integrated sensor signal Vout is ramping up. When integrated sensor signal Vout is larger than the first reference potential Vb3, the comparator 402 output signal CompOut is high and this causes the controller unit 6 to set the number of counts up by one unit. In turn, the controller unit 6 sets the second and third switches S1, S1' to their open state and the first and fourth switches S2, S2' to closed. At a result, the charge packet Cref•Vref from the reference circuit 5 is injected into integration node Vneg. At the same time the controller unit 6 increments an counter output signal ADC_COUNT by one count. After the charge injection, the integrated sensor signal Vout is lower than the first reference potential Vb3 and the reference circuit, i.e. the reference capacitor 51 is recharged. This is achieved by switching switches S2, S2' open and switches S1, S1' closed as apparent from the drawing. For charge dumping the counter increments the counter output signal ADC_COUNT by one count. The number of counts collected during a given overall integration time is a measure of the sensor signal.

Depending on the state of sensor switch S3 the sensor arrangement is operated in light sensing or temperature sensing mode. For example, in light sensing mode the light sensor 21, preferably a photodiode, is electrically connected to integration node Vneg. The clamp voltage for integration node Vneg is at the first reference potential Vb1 which is normally at ground level. The amplifier second input 42 (positive terminal) is biased at the second reference potential Vb1. The cross voltage for the reference circuit is also given by the second reference potential Vb1 during charging.

In temperature sensing mode the temperature sensor is electrically connected to integration node Vneg. Preferably the temperature sensor 11 provides a Proportional To Absolute Temperature current Iptat. The clamp voltage for the integration node Vneg is at the second reference potential Vb1 which may be different in value compared to light sensing mode and is normally above ground level; the amplifier second input 42 (positive terminal) is biased at second reference potential Vb1. The cross voltage for the reference circuit is also given by the first reference potential Vb1 during charging.

FIG. 3 shows an exemplary embodiment of a temperature sensor to be used with a sensor arrangement for light sensing and temperature sensing according to the principle presented. On an input side of an amplifier AMP a first amplifier input + is connected to a first branch Q1, R1, MP1, and a second amplifier input − is connected to a second branch Q2, MP2. The first branch comprises a series connection of transistor MP1, resistor R1 and transistor Q1. The second branch comprises a series connection of transistor MP2 and transistor Q2. Transistors MP1, MP2 are connected to ground potential via one of their input sides and interconnected to each other via their control sides. Transistors MP1, MP2 are matched in a 1 over p ratio, p being an integer number. Transistors Q1, Q2 are interconnected via a diode connection. An amplifier output of the amplifier AMP is connected to transistors MP1, MP2 via their control sides.

A third branch comprises transistor MP3 and MN1 and is connected to the amplifier output of the amplifier AMP via transistor MP3's control side which is further connected to transistors MP1, MP2 via their control sides. Transistor MN1 is connected to another transistor MN2 in a current mirror fashion. An output of the current mirror provides the thermo current IPTAT.

A feedback loop comprising amplifier AMP and transistors MP1, MP2, Q1, Q2 and resistor R1 generates a PTAT voltage $\Delta V_{BE}$ across a resistor R1 given by $$\Delta V_{BE} = V_{BE(Q2)} - V_{BE(Q1)} = kT/q \cdot \ln(p),$$

wherein $V_{BE(Q2)}$, $V_{BE(Q1)}$ are base-emitter voltages of transistors Q1, Q2, respectively, and k is Boltzmann's constant, T is temperature, and q is charge.

Through transistor MP3 and current mirror MN1/MN2, and assuming that R1 is linear over temperature, a PTAT current
is generated, given by $$IPAT = M \cdot \Delta V_{BE}/R1,$$

wherein M is a matching factor of the current mirror.

The invention claimed is:
1. A sensor arrangement for light sensing and temperature sensing, comprising:
   a first sensor input (1) for connecting a temperature sensor (11) and a second sensor input (2) for connecting an ambient light sensor, a sensor switch (S3) for electrically connecting either the first or the second sensor input (1, 2) to an integration input (41) of an integrating analog-to-digital converter (4), a reference circuit (5) connected to the integration input (41) via a first switch (S2), a first reference input (44) of the integrating analog-to-digital converter (4) to be connected with a first reference potential (Vb3), and a microcontroller unit (6) connected to an integration output (43) of the integrating analog-to-digital converter (4) and designed to control the first switch (S2) depending on an integrated sensor signal (Vout) integrated by the integrating analog-to-digital converter (4) and depending on the first reference potential (Vb3), wherein the reference circuit (5) comprises a reference capacitor connected to a reference terminal (53) to be connected with the second reference potential (Vb1), via a second switch (S1), a ground potential (54), via a third switch (S1'), the reference terminal (52) via a fourth switch (S2'), wherein the first, second, third and fourth switches (S1, S1', S2') are switched by means of the microcontroller unit (6) such that the first and fourth switch (S2, S2') are in their open state when the second and third switches (S1, S1') are in their closed state, and the first and fourth switch (S2, S2') are in their closed state when the second and third switches (S1, S1') are in their open state, and wherein the integrating analog-to-digital converter (4) comprises:

an integrator comprising an amplifier (401) with the integration input (41) and the second reference input (42) as input terminals, an amplifier output (45), and an integration capacitor (46) connecting the integration input (41) and the amplifier output (45), and a comparator (402) connected via a first comparator input (47) to the amplifier output (45), and comprising the first reference input (44) as second comparator input and comprising the integration output (43) as comparator output.

2. The sensor arrangement according to claim 1, wherein the sensor arrangement is operated in a temperature sensing mode when the sensor switch (S3) electrically connects the first sensor input (1) to the integration input (41) and in a light sensing mode, when the sensor switch (S3) electrically connects the second sensor input (2) to the integration input (41).

3. The sensor arrangement according to claim 1 or 2, wherein the microcontroller unit (6) is designed to control the first switch (S2) to switch the first switch between its open state and its closed state depending on a clock cycle (CLK).

4. The sensor arrangement according to claim 3, wherein the integrating analog-to-digital converter (4) comprises a second reference input (42) to be connected with a second reference potential (Vb1).

5. The sensor arrangement according to claim 1, wherein the first reference potential (Vb3) is set to different values depending on whether the first or the second sensor input (1, 2) is electrically connected to the integration input (41).

6. The sensor arrangement according to claim 1, wherein the reference capacitor (51) is further connected between a reference terminal (52) to be connected with a reference potential (Vref) and to the first switch (S2).

7. The sensor arrangement according to claim 1, wherein the temperature sensor (11) comprises a bandgap voltage reference circuit.

8. The sensor arrangement according to claim 1, wherein the microcontroller unit (6) comprises a timer to set an overall integration time.

9. The sensor arrangement according to claim 1, wherein the capacity of the reference capacitor (51) and/or the capacity of the integration capacitor (46) are adjustable.

10. An integrated circuit comprising a sensor arrangement according to claim 1.

* * * * *